US008000335B2

United States Patent
Shiga et al.

(10) Patent No.: US 8,000,335 B2
(45) Date of Patent: Aug. 16, 2011

(54) MEDIA GATEWAY AND CONTROL METHOD THEREOF

(75) Inventors: Shingo Shiga, Tokyo (JP); Kazuhiko Harasaki, Tokyo (JP); Toshiyuki Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 611 days.

(21) Appl. No.: 12/016,316

(22) Filed: Jan. 18, 2008

(65) Prior Publication Data

US 2008/0192759 A1    Aug. 14, 2008

(30) Foreign Application Priority Data

Feb. 8, 2007    (JP) .................................. 2007-029204

(51) Int. Cl.
*H04W 4/00* (2009.01)
*H04L 12/66* (2006.01)
*H04L 12/28* (2006.01)
*H04J 3/16* (2006.01)

(52) U.S. Cl. ......... 370/401; 370/338; 370/352; 370/466
(58) Field of Classification Search ........................ None
See application file for complete search history.

(56) References Cited

U.S. PATENT DOCUMENTS

| | | | |
|---|---|---|---|
| 2003/0231639 A1* | 12/2003 | Mikkola | 370/401 |
| 2005/0085181 A1* | 4/2005 | Tao | 455/1 |
| 2007/0104096 A1* | 5/2007 | Ribera | 370/229 |

FOREIGN PATENT DOCUMENTS

| | | | |
|---|---|---|---|
| CN | 1553668 A | | 12/2004 |
| GB | 2352358 A | * | 1/2001 |
| JP | 2004534439 A | | 11/2004 |
| JP | 2005537700 A | | 12/2005 |
| JP | 2006186982 A | | 7/2006 |

OTHER PUBLICATIONS

European Search Report for EP 08 07 5091 completed Sep. 4, 2009.
Chinese Office Action for CN200810008991.2 issued Apr. 20, 2011.

* cited by examiner

*Primary Examiner* — Daniel J Ryman
*Assistant Examiner* — Thinh D Tran

(57) ABSTRACT

A media gateway, which generates a context based on a control message transmitted from a media gateway controller and controls bearer transfers between a first network and a second network, comprises a context determination unit, an optimization judgment unit, an optimization processing unit, and a context control unit. The context determination unit determines an existence of an internal connection between a first context related to the first network and a second context related to the second network based on the respective control messages. The optimization judgment unit judges a possibility for generating a new third context by combining the first context and the second context, when the internal connection exists. The optimization processing unit generates the third context when it is possible to generate, and associates resource information of the third context with each of resource information of the first context and the second context. The context control unit controls the bearer transfer between the first network and the second network based on the third context, and performs communication with the media gateway controller using respective resource information of the first context and the second context.

8 Claims, 13 Drawing Sheets

MEDIA GATEWAY AND CONTROL METHOD THEREOF

INCORPORATION BY REFERENCE

This application is based upon and claims the benefit of priority from Japanese Patent Application No. 2007-029204, filed on Feb. 8, 2007, the disclosure of which is incorporated herein in its entirety by reference.

BACKGROUND OF THE INVENTION

1. Technical Field

The present invention relates to a media gateway and a control method thereof and in particular, relates to the media gateway and the control method thereof which autonomously optimize resources of the media gateway.

2. Background Art

Daily progress of communication system is so rapid. In consequence, there are growing demands for communicating by voice, data, a still image and video at high transmission speed in a communication network. In order to cope with the demand, a study on formation of next generation carrier network represented by NGN (Next Generation Network) is being promoted. According to formation of NGN, various existing communication networks such as PSTN (Public Switched Telephone Network) which is a circuit switched network for conventional voice communication and a mobile communication network are unified as an integrated network based on packet communication with an IP (Internet Protocol) technology. A voice signal is transmitted with a VoIP (Voice over Internet Protocol) technology there. Further, a technology to aim at an efficient and seamless connection between different types of networks is also being proposed.

Japanese Patent Publication No. 2004-534439, which is corresponding to International Publication WO2002/087160 and U.S. Publication No. 2004/0166843, and is referred to as a patent document 1 hereinafter, discloses a technology to convey IP traffic between heterogeneous mobile radio systems, for example between a public mobile radio network of 2G/3G (Second generation/third generation) and WLAN (Wireless Local Area Network). According to the technology, each of the heterogeneous mobile radio systems includes an access node (For example, GGSN(Gateway GPRS Support Node), and LMA(Local Mobility Agent)) to a packet data network represented by the Internet. A seamless service between a mobile terminal and the packet data network via the access node is provided. According to the technology, the access node of the second mobile radio network (e.g. WLAN) can only be indirectly connected to the packet data network via the access node of the first mobile radio network (e.g. public mobile radio network of 2G/3G type). The packet data is indirectly transferred, via the access node of the first mobile radio network, from the second mobile radio network to the packet data network connected with the first mobile radio network.

Another technology is disclosed, in which a connection between different types of networks is set up through separately arranging a media gateway as a bearer transmission node and a media gateway controller as a control node. Japanese Patent Publication No. 2005-537700, which is corresponding to International Publication WO2004/006598 and U.S. Publication No. 2006/0153205, and is referred to as a patent document 2, discloses a technology in which a media gateway optimally changes coding using a command transmitted from a media gateway controller. This technology allows for an efficient changeover of codings in terminations at a media gateway based on the command and enables switching between codings that the media gateway is unable to convert into each other. The Media Gateway, after arrival of the command, checks for the connectibility of the terminations of a context with new coding when the media gateway determines, as a result of one or more further commands arriving at the Media Gateway, that it has available current commands to be executed for changing the codings in terminations of the context.

Further, an apparatus is disclosed, in which a connection between different types of networks is set up from resource saving point of view in consideration to an advanced and complicated communication environment. Japanese Patent Publication No. 2006-186982, which is corresponding to U.S. Publication No. 2006/0133353, and is referred to as a patent document 3, discloses a technology with regard to a soft switch device described below. According to this technology, the soft switch device acquires an initial address message IAM at a calling side, and analyzes information of the calling party and the called party based on the acquired initial address message IAM. When it is found that the calling party and the called party are controlled by the same media gateway, the soft switch device informs the media gateways to generate a context and to add TDM (Time Division Multiplexing) semi-permanent physical terminations of time slots, which are corresponding to the calling party and the called party, into the context. Thus, a local loop of TDM voice can be implemented, reduce IP loop of RTP (Real-time Transmission Protocol) streams and efficiently reduce network resources such as steps for digital signal processing, echo cancellation, etc.

SUMMARY

An exemplary object of the present invention is to provide a media gateway and a control method thereof that can autonomously optimize resources which are redundantly included in at least two contexts inside the media gateway, and the resource optimization processing is performed without any influence on an existing protocol between the media gateway and a media gateway controller.

According to the present invention, a media gateway, which generates a context based on a control message transmitted from a media gateway controller and controls bearer transfers between a first network and a second network, comprises a context determination unit, an optimization judgment unit, an optimization processing unit, and a context control unit.

The context determination unit determines whether or not an internal connection of same bearer stream exists between a first context related to the first network and a second context related to the second network based on the respective control messages transmitted from the media gateway controller. The optimization judgment unit judges whether or not it is possible to generate a new third context by combining the first context and the second context, when the context determination unit determines that the internal connection exists. The optimization processing unit generates the third context when it is determined that the third context can be generated, and associates resource information of the third context with each of resource information of the first context and resource information of the second context. The context control unit controls the bearer transfer between the first network and the second network based on the third context, and performs communication with the media gateway controller based on referring to the resource information of the first context and the resource information of the second context.

According to the present invention, a method for controlling a media gateway which generates a context based on a control message transmitted from a media gateway controller and controls bearer transfers between a first network and a second network, comprises:

determining whether or not there exists an internal connection inside the media gateway between a first context related to the first network and a second context related to the second network based on the resource information of the first context and the resource information of the second context;

judging whether or not it is possible to generate a new third context through combining the first context and the second context when it is determined that the internal connection exists;

generating the third context when it is judged that the third context can be generated, and associating resource information of the third context with each of resource information of the first context and resource information of the second context; and controlling the bearer transfer between the first network and the second network based on the third context, and communicating with the media gateway controller based on referring to the resource information of the first context and the resource information of the second context.

BRIEF DESCRIPTION OF THE DRAWINGS

Exemplary features and advantages of the present invention will become apparent from the following detailed description when taken with the accompanying drawings in which:

FIG. 12A shows a network arrangement prior to performing the optimization according to the preferred embodiment of the present invention, and FIG. 12B shows an optimized network arrangement performed by the preferred embodiment of the present invention.

EXEMPLARY EMBODIMENT

An exemplary embodiment of the present invention will now be described in detail in accordance with the accompanying drawings.

First, a positioning of a media gateway in a network and a meaning of optimization of resources in the media gateway will be described in the following with reference to FIG. 1 and FIG. 2.

Figure 1:
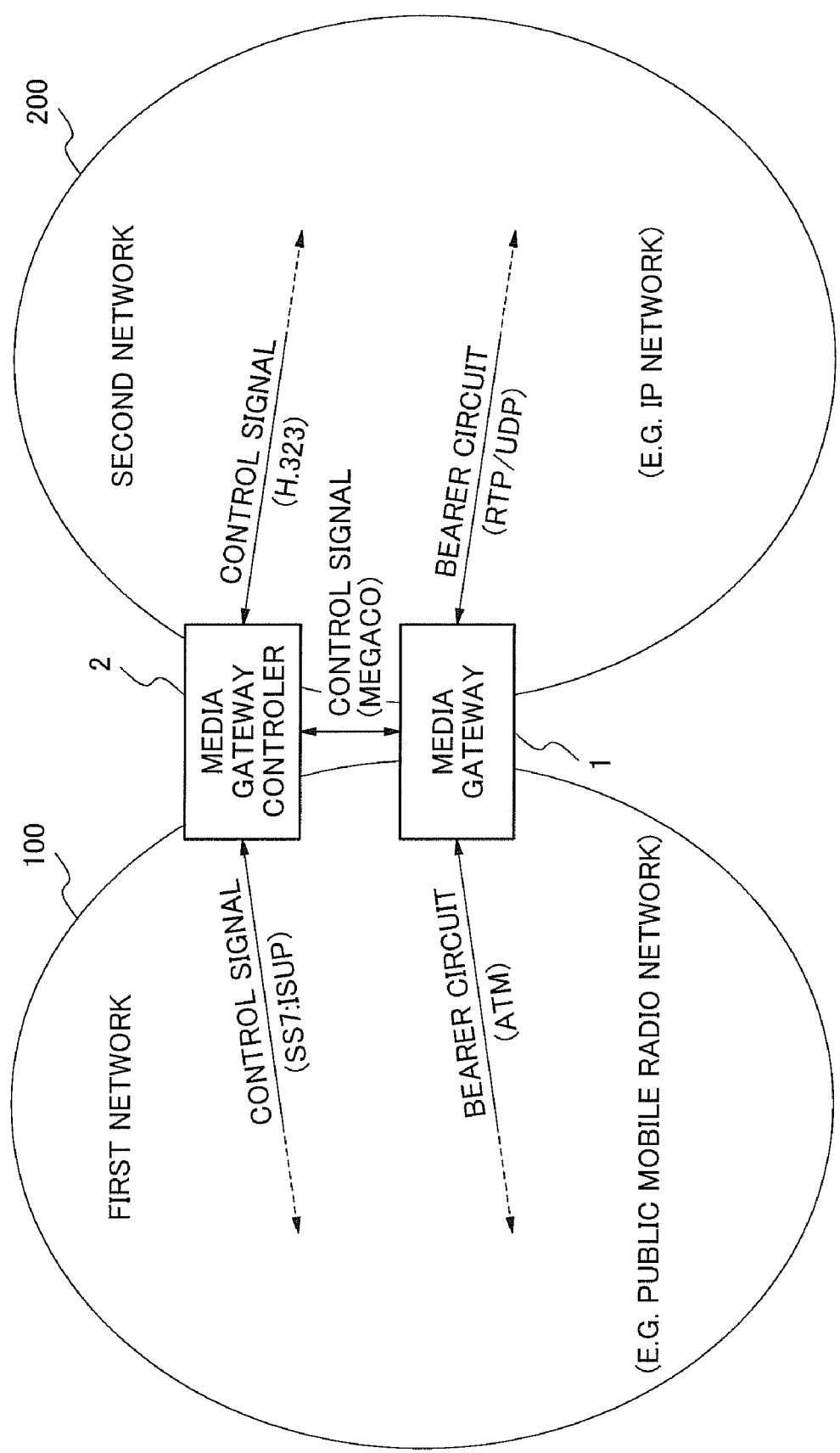
FIG. 1 is a schematic diagram of network configuration which describes a positioning of a media gateway in a network according to an exemplary embodiment of the present invention.

FIG. 1 is a schematic diagram of a network configuration which describes a positioning of the media gateway in a network according to an exemplary embodiment of the present invention. FIG. 1 shows a system which sets up a network connection between different types of networks through separately arranging the media gateway as a bearer transmission node and the media gateway controller as a control node. Here, a first network 100 and a second network 200 are the different types of networks each other. For example, the first network 100 is a public mobile radio network and the second network 200 is an IP network which transmits information through sending and receiving of an IP packet. Then, a voice communication between the different types of networks is realized.

A media gateway 1 is an apparatus which mutually converts and transmits a bearer which is used in each of the first network 100 and the second network 200. For example, ATM (Asynchronous Transfer Mode) based cell data is applied to a bearer in the first network 100. Furthermore, an IP packet using RTP (Real-time Transport Protocol)/UDP (User Datagram Protocol) is applied to a bearer in the second network 200. TDM (Time Division Multiplex) based voice data may be a bearer when the first network 100 is PSTN (Public Switched Telephone Network).

A media gateway controller 2 is an apparatus which terminates control signals used in respective networks. For example, in the first network 100, an SS7 (Signaling System No. 7) is used as a control signal and a routing control is performed between communication nodes (not shown) within the network. Accordingly, a connection between the media gateway 1 and a communication terminal (not shown) within the network is set up. The media gateway controller 2 terminates the control signal for call connection between the different types of networks. In the second network 200, the media gateway controller 2 terminates a control protocol of H.323 which performs real-time communication of audio, video and other data in an IP network.

Control protcols, for example, MEGACO (MEdia GAteway COntrol)/H.248 or MGCP (Media Gateway Control Protocol)/RCF3435 maybe applied to a control protocol between the media gateway 1 and the media gateway controller 2. This control protocol is used between the Media Gateway and the Media Gateway Controller in a VoIP network to define the necessary control mechanism to allow a Media Gateway Controller to control Gateways in order to support voice calls between PSTN (including a public mobile radio network) and IP network.

Next, an optimization of resources in the media gateway arranged in the network with an above-mentioned position will be described below with reference to FIG. 2.

Figure 2:
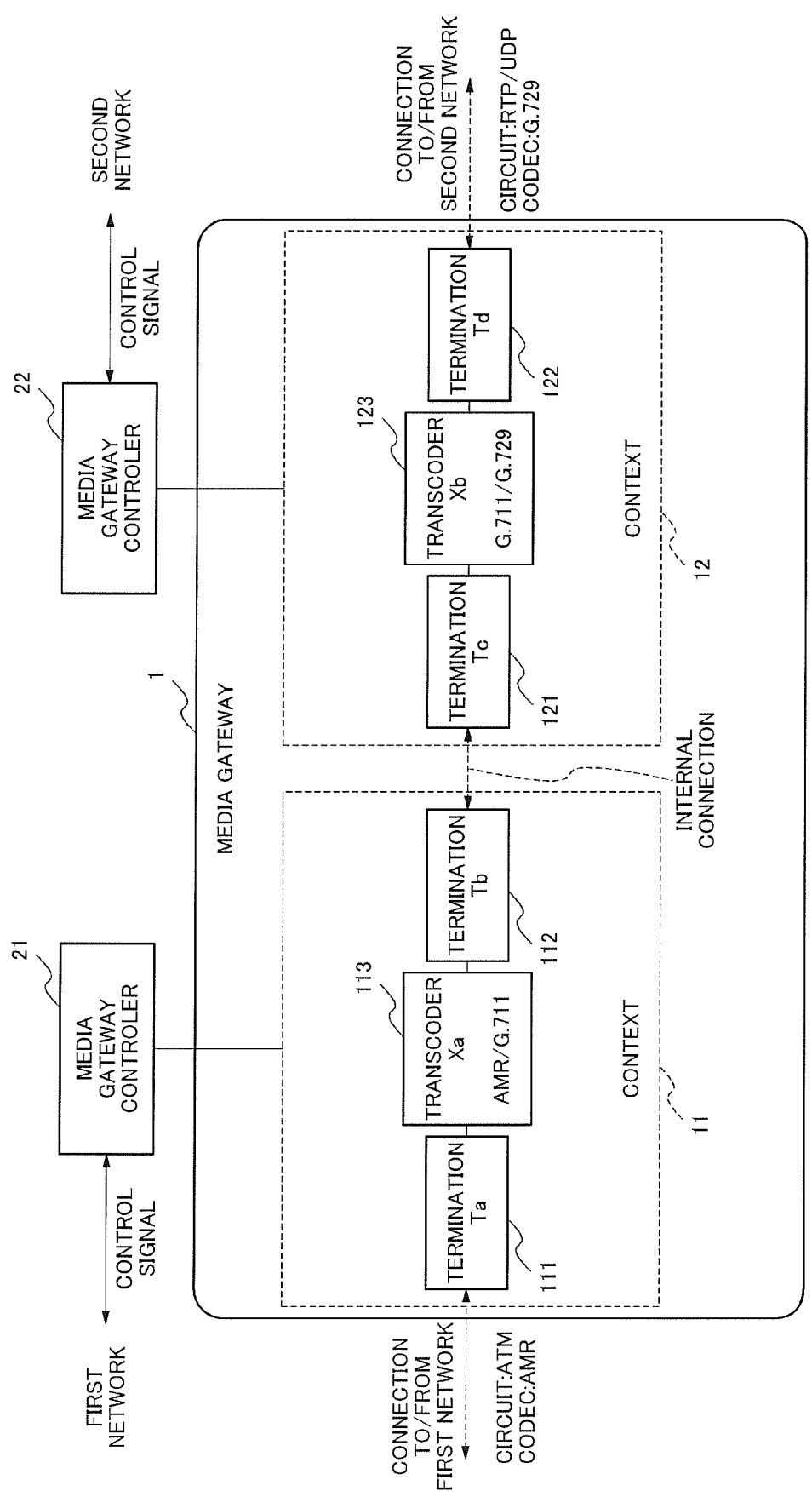
FIG. 2 is a block diagram describing a problem, which exists in the related art described in the background art, with regard to optimization of resources in the media gateway which provides an environment for a voice communication between different types of networks using the IP telephony, i.e. VoIP.

FIG. 2 is a block diagram describing an issue about the optimization of the resources included in the media gateway 1 of the related art described in the background art which provides an environment for a voice communication between the different types of networks, i.e. IP telephony or VoIP.

There are two types of context, a context 11 regarding a connection corresponding to the first network and a context 12 regarding a connection corresponding to the second network, in the media gateway 1. The context 11 and the context 12 relate to each of bearer streams in the same connection, in which the bearer flows from the first network to the second network, or vice versa, and media conversion is performed between the different types of networks. The context 11 is controlled by a media gateway controller 21, and the context 12 is controlled by a media gateway controller 22. Each control is performed independently.

Here, the context means a unit to be controlled in a certain apparatus, and a plurality of resources are associated to the context in the apparatus.

A termination Ta 111 which terminates a connection to/from a destination node (not shown) in the first network and a termination Tb 112 which terminates one end of an internal connection inside the media gateway 1 are associated with the context 11. Furthermore, a termination Tc 121 which terminates other end of the internal connection inside the media gateway 1 and a termination Td 122 which terminates a connection to/from a destination node (not shown) in the second network are associated with the context 12.

A transcoder Xa 113, which converts a codec type for audio data compression, is provided between the termination Ta 111 and the termination Tb 112. A transcoder Xb 123 also is provided between the termination Tc 121 and the termination Td 122. In FIG. 2, for example, AMR (Adaptive Multi-rate Compression) is used as a audio data compression scheme in the first network, and G.729 is used as the audio data compression scheme in the second network. Moreover, G.711 is used as the audio data compression scheme in the internal connection of the media gateway 1. Accordingly, the transcoder Xa 113 which mutually converts each of the codec types of AMR and G.711, and the transcoder Xb 123 which mutually converts each of the codec types of G.729 and G.711 are associated with the context 11 and the context 12 respectively.

It can be easily understood that redundant constituents are included in the contexts 11 and 12 controlled by the respective media gateway controllers 21 and 22 as mentioned above.

In other words, the termination Tb 112 and the termination Tc 121 are endpoints of the internal connection of the same stream between the contexts which is a closed connection within the media gateway 1, and they are functionally redundant. When the transcoder Xa 113 and the transcoder Xb 123 can be unified into one transcoder (e.g., a transcoder which mutually converts each of the codec types of AMR and G.729), these transcoders of the transcoder Xa 113 and the transcoder Xb 123 are also redundant.

Generally, a termination and a codec conversion are usually performed by signal processing function in which available resources are limited. Therefore, performing twice signal conversion operations for one stream as mentioned above results in waste of the resources. Further, performing codec converting operations in a plural number of times causes deterioration of voice quality.

According to the related art described in the background art, the termination Tb 112, the termination Tc 121, the transcoder Xa 113 and the transcoder Xb 123 cannot be omitted. In the technology, the termination Ta 111 and the termination Tb 112 are associated with each other by the context 11, and also the termination Tc 121 and the termination Td 122 are associated with each other by the context 12. That is, a whole operation of the apparatus is controlled on the condition that each context is controlled independently. Therefore, it is impossible to perform a control operation to separate and omit the termination Tc 121 and the termination Td 122 from the contexts respectively.

By the same reason, even if a transcoder which can mutually convert the codec types of AMR and G.729 is available and even if it is possible to convert an audio data compression scheme by one transcoder, the transcoder Xa 113 and the transcoder Xb 123 associated with the respective contexts 11 and 12 cannot be omitted.

Moreover, if a reconfiguration of resources is to be performed in a media gateway according to the related art described in the background art, it should be necessary to change various settings for controls in the media gateway itself and also settings for controls in related media gateway controllers. Furthermore, if optimization of resources in the media gateway is to be performed by means of controls from the media gateway controllers wherein each of the media gateway controllers is dedicated for respective networks of the different types of networks, it should be necessary to perform cooperative operations between each of media gateway controllers. Therefore, new software for performing an optimizing control should be installed into each of media gateway controllers.

Such restrictions cause another issue of an operational aspect, and actual operational load of the network system increases.

Accordingly, the present invention realizes an autonomous control operation for resource optimization by omitting redundant constituents in resources associated with at least two contexts which are connected inside the media gateway for the same stream. Moreover, the present invention realizes the resource optimization without any influences on an existing protocol between the media gateway and the media gateway controller.

A preferred exemplary embodiment of the present invention will be described with reference to FIG. 3 to FIG. 11.

Figure 3:
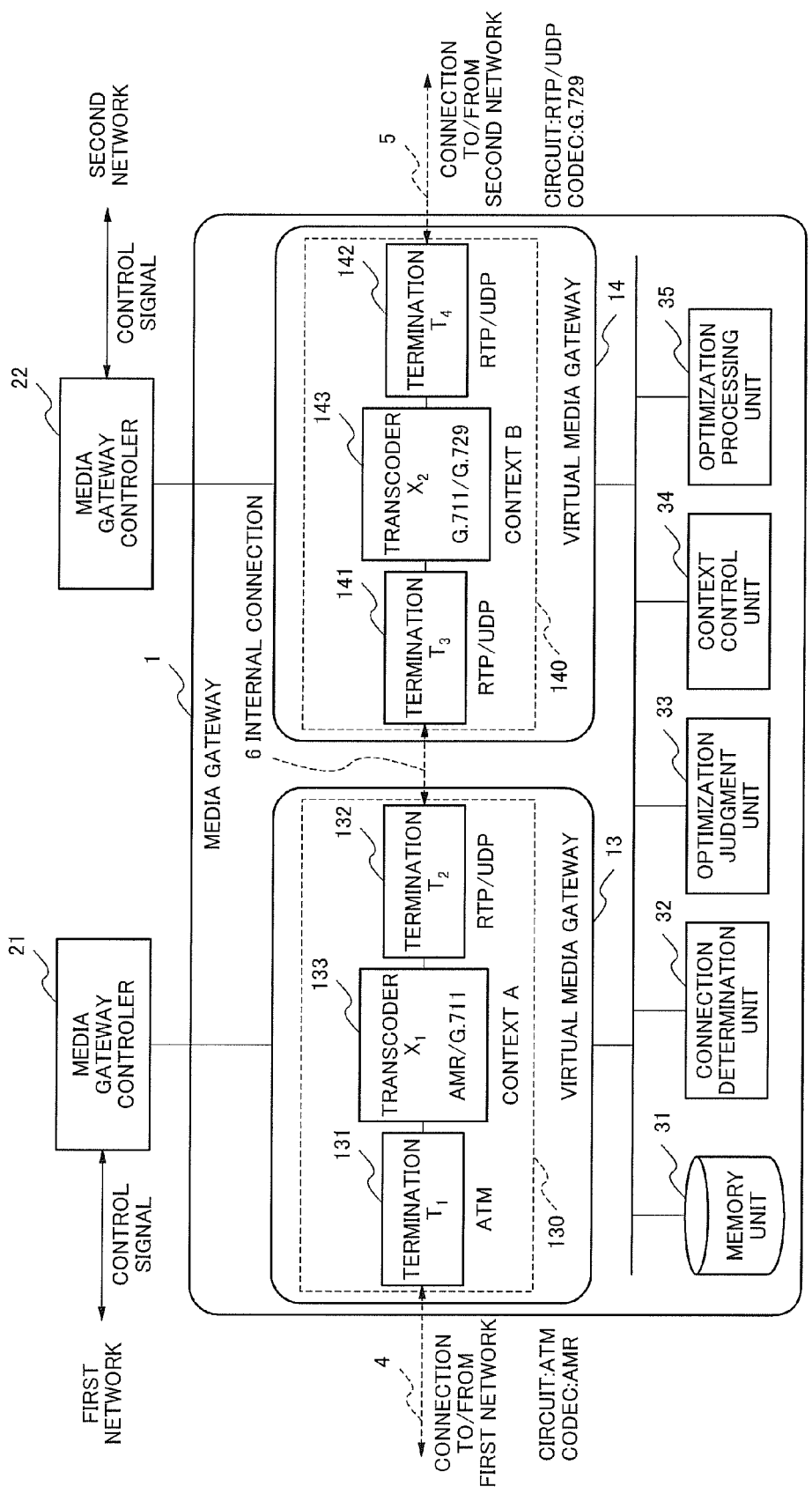
FIG. 3 is a block diagram showing configuration of the media gateway before resource optimization processing according to the exemplary embodiment of the present invention is executed.
Figure 4:
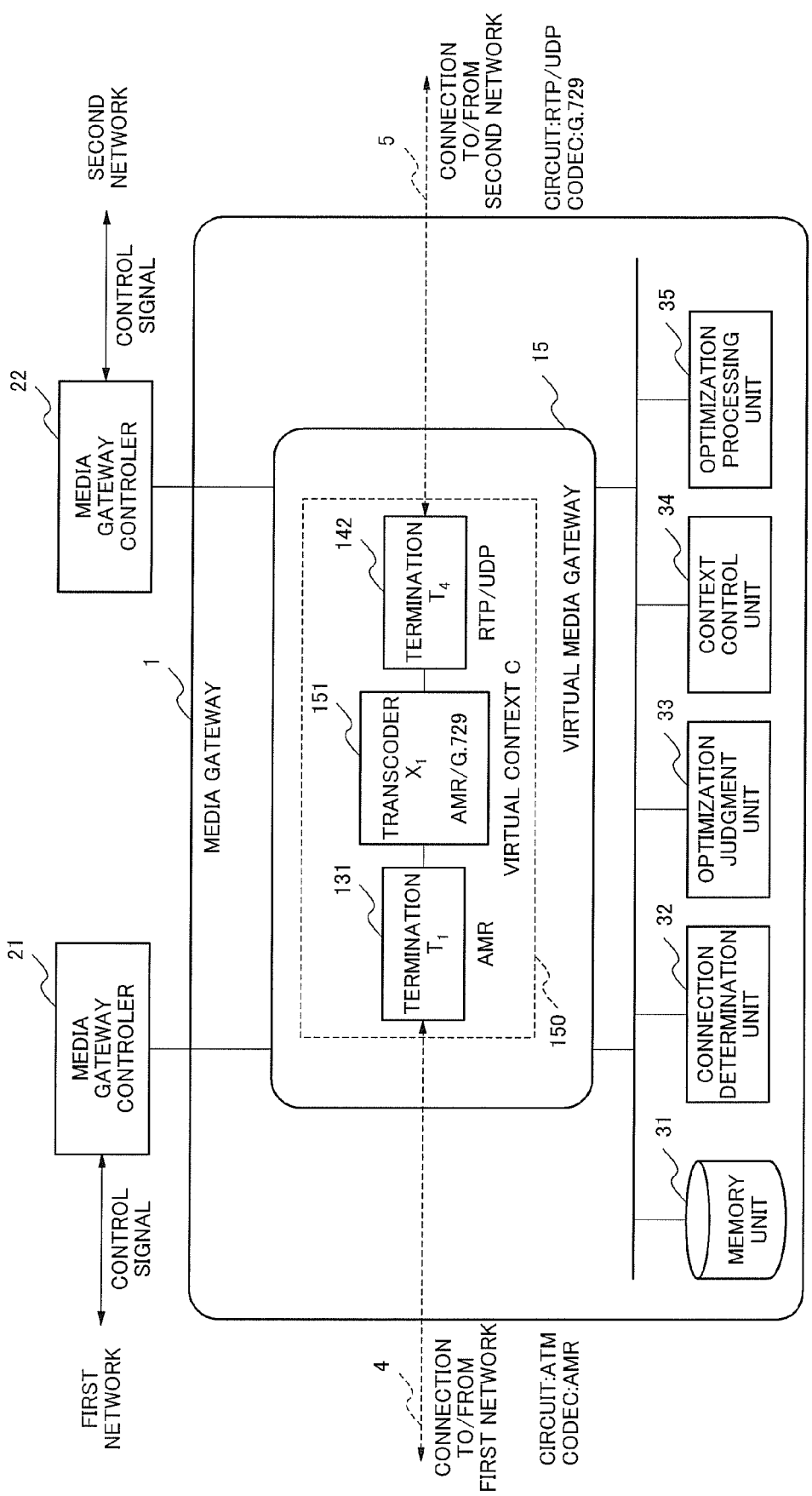
FIG. 4 is a block diagram showing the configuration of the media gateway after the resource optimization processing according to the exemplary embodiment of the present invention has been executed.

FIG. 3 is a block diagram showing a configuration of the media gateway before a resource optimization processing according to an exemplary embodiment of the present invention is performed. FIG. 4 is a block diagram showing a configuration of the media gateway after a resource optimization processing according to an exemplary embodiment of the present invention has been performed.

As described above with reference to FIG. 1 and FIG. 2, the media gateway 1 is controlled by the media gateway controller 21 and the media gateway controller 22 based on respective control signals in the first network and the second network. Then, a context corresponding to each network is set in the media gateway 1. In this state, the resource optimization processing is not performed yet. FIG. 3 is a block diagram showing a configuration of the media gateway 1 in such state.

The media gateway 1 performs the resource optimization processing mentioned below and sets up a virtual context as shown in FIG. 4 in the state.

Further, resource optimization means combining a plurality of contexts which are included in a same stream in an apparatus to generate a new context, and making a state to be controlled by the new context. Resources mean one or more objects to be controlled which are associated with the context, and they include at least a termination, a connection, and a transcoder.

With respect to a plurality of contexts, for example, two types of context exist in the media gateway, a context A regarding a connection corresponding to a first network and a context B regarding a connection corresponding to a second network, wherein the first network and the second network are different types of networks each other. The context A and the context B relate to each of bearer streams in the same connection, in which the bearer flows from the first network to the second network, or vice versa, and media conversion is performed between the different types of networks. The context A and the context B are controlled by a media gateway controller A and a media gateway controller B, and each control is performed independently. Here, as for the media gateway controller A and the media gateway controller B, it is not indispensable for providing physically separated media gateway controllers. The media gateway controllers A and B may be the same hardware and separated media gateway controller functions can be provided as far as each control for a dedicated network is performed independently.

A context A 130 is a unit to be controlled and generated by the media gateway 1 in accordance with an instruction by the media gateway controller 21, with reference to FIG. 3. When the media gateway 1 is controlled by the media gateway controller 21 based on the control signal of the first network, the context A 130 is used. That is, the media gateway 1 is controlled as a virtual media gateway 13, by the media gateway controller 21 using the context A 130. Similarly, a context B 140 is generated by the media gateway 1 in accordance with an instruction by the media gateway controller 22 based on the control signal of the second network, and the media gateway 1 is controlled as a virtual media gateway 14 by the media gateway controller 22 using the context B 140.

Setting information (including resource information) for generating a virtual context C 150 shown in FIG. 4 is associated with the context A 130 and the context B 140 and, is stored. After the resource optimization processing has been performed, the virtual context C 150 newly generated becomes available and is controlled as a virtual gateway 15, and bearer transfer between the first network and the second network is controlled by using the virtual context C 150.

An internal connection 6 in FIG. 3 is a connection which connects the contexts relating to the same stream within the media gateway 1. Connections with the reference number 4 and 5 are connections for connecting with the outside of the media gateway 1. That is, the connection 4 is connected with a neighbor node (not shown) in the first network, and the connection 5 is connected with a neighbor node (not shown) in the second network. The connection 4 and the connection 5 shown in FIG. 4 are also the same as ones in FIG. 3. A connection here may be a connection between contexts or a connection between resources. Although a connection between resources in a context is also a broadly defined connection, the connection between resources in a context is called an association according to Megaco protocol.

Resources associated with a context will be described below. In FIG. 3, T1, T2, T3 and T4 corresponding to reference numbers 131, 132, 141 and 142 respectively are logic entities which are called termination for sending and receiving a stream that is an object for repeating (or relaying), and are endpoints of connections. The media gateway controller 21 gives a destination address and a port number or the like to the termination Ti 131 and the termination T2 132. The media gateway controller 22 gives a destination address and a port number or the like to the termination T3 141 and the termination T4 142.

In FIG. 3, X1 and X2 corresponding to reference numbers 133 and 143 respectively are transcoders and also resources with a function to convert a codec type for audio data compression. The transcoder X1 133 mutually converts codec types of AMR and G.711, and the transcoder X2 143 mutually converts codec types of G.729 and G.711 like the transcoder Xa 113 and the transcoder Xb 123 described in FIG. 2. The transcoder X1 133 converts a codec type between the termination T1 131 and the termination T2 132, and the transcoder X2 143 converts a codec type between the termination T3 141 and the termination T4 142. Thus, the termination T1 131 and the termination T2 132 are associated with each other via the transcoder X1 133 by the context A 130, and the termination T3 141 and the termination T4 142 are associated with each other by the context B 140 via the transcoder X2 143.

A transcoder X3 151 shown in FIG. 4 mutually converts codec types of AMR and G.729. The transcoder X3 151 makes a connection with the termination T1 131 and the termination T4 142 in the virtual context C150. Further, each of transcoders X1 to X3 is dedicated hardware such as LSI which supports a specific codec conversion. When the resource optimization processing is performed, resources of the transcoder X1 133 and the transcoder X2 143 are released, while resources of the transcoder X3 151 is available instead.

Further, it is possible to make the transcoders X1 to X3 to function as a logical entity of software. In this case, any one of the transcoder X1 131 and the transcoder X2 143 before resource optimization processing may be utilized as the transcoder X3 151 after the resource optimization processing through changing setting of the software program.

Next, each functional unit of the media gateway 1 will be described below with reference to FIG. 3 according to an exemplary embodiment of the present invention. Further, an identical configuration is also shown in FIG. 4. The media gateway 1 includes a memory unit 31, a connection determination unit 32, an optimization judgment unit 33, a context control unit 34 and an optimization processing unit 35. Further, the common functional unit of the media gateway 1 except for these functional units mentioned above is not illustrated.

Figure 5:
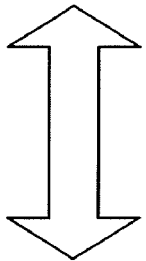
FIG. 5 shows an example of setting information of a context in the media gateway according to the exemplary embodiment of the present invention.

The memory unit 31 stores setting information relating to each context generated in the media gateway 1. Specifically, the memory unit 31 stores setting information of resources associated to each context, as shown in FIG. 5 described below. Although it is not illustrated in FIG. 5, the memory unit 31 also stores function information and performance information of the termination and the transcoder, which are resources associated by the context. Here, function information means information by which a function of the resource can be distinguished and it includes available function to provide, such as codec types possible to convert and circuit types possible to connect. Moreover, performance information includes information on processing power of a device such as CPU.

The connection determination unit 32 determines whether or not a connection between the contexts exists based on the setting information on the context stored in the memory unit 31. In other words, the connection determination unit 32 determines whether or not an internal connection (i.e. connection which connects a plurality of contexts for the same stream only inside an apparatus) which is closed inside the media gateway exists.

The optimization judgment unit 33 judges whether or not a new context can be generated based on the function information or the performance information on the resources associated with the context, that is, whether the resource optimization processing can be performed.

Specifically, the optimization judgment unit 33 judges whether or not the resource optimization processing can be performed based on the following judgment criteria:

whether or not the number of resources associated with a context to be newly generated for resource optimization can be reduced from the number of resources associated with original contexts (a first judgment criterion);

whether or not it is possible to maintain communication using resources which are associated with a context to be newly generated for the resource optimization (a second judgment criterion); and whether or not any resources which become a bottleneck in performance exist in resources which are associated with a context to be newly generated for the resource optimization (a third judgment criterion).

Specific examples of the first judgment criterion are as follows:

whether or not the number of circuit resources can be reduced using only the termination T1 131 and the termination T4 142 without using the termination T2 132 and the termination T3 141 shown in FIG. 3; and whether or not the number of transcoder resources can be reduced using one transcoder which directly converts a codec type for audio data compression into AMR/G.729, without using two transcoders of the transcoder X1 133 (AMR/G.711) and the transcoder X2 143 (G.711/G.729) shown in FIG. 3.

A specific example of the second judgment criterion is as follows:

whether or not a proper connection can be established by using resources associated with a newly generated context (e.g., whether or not a transcoder includes a function to directly convert a codec type for audio data compression into AMR/G.729, or whether or not such a transcoder is installed).

Specific examples of the third judgment criterion are in the following:

whether or not it is judged that a processing capability of a specific termination becomes bottleneck due to limitation in the processing power (e.g., the processing power of DSP (Digital Signal Processor) in the termination), when processing load is concentrated on the termination by reducing a number of terminations; and whether or not it is judged that a processing performance of resources associated with a newly generated context is not enough comparing with a processing performance of resources associated with original contexts.

The optimization judgment unit 33 may judge whether or not a resource optimization processing is performed based on all criteria of the first to the third criteria, or may judge the same based on at least the first criterion. Moreover, the optimization judgment unit 33 may judge based on the first criterion and any one of the second and the third criteria. The combination of the criterion is decided based on a situation of provision of resources in the media gateway. For example, when it is clear that resources in the media gateway are being provided so that the second and the third criteria is not be adopted, the optimization judgment unit 33 may judge only based on the first criterion. In particular, when it is judged that the codec conversion for the audio data compression can be realized efficiently by replacement of the transcoder, and consequently quality of communication becomes improved, the optimization judgment unit 33 may judge to perform the resource optimization processing even if the number of resources can not be reduced.

The optimization processing unit 35 performs the resource optimization processing when the connection determination unit 32 determines that an internal connection between the contexts exists, and the optimization judgment unit 33 judges that it is necessary to perform the resource optimization processing. The optimization processing unit 35 performs the resource optimization processing to generate a new context through combining a plurality of contexts which are connected each other by the internal connection. Specifically, as shown in FIG. 4, the optimization processing unit 35 changes setting information of the context so that the virtual context C 150 may associate the termination T1 131 with the termination T4 142 via the transcoder X3 151, and the media gateway 1 may work as the virtual media gateway 15.

And the media gateway 1 controls the function as a media gateway under this environment. The context control unit 34 performs this control.

After completion of the resource optimization processing, the context controller 34 performs communication controls with the media gateway controller 21 and the media gateway controller 22 through using information of the original context A 130 and the original context B140 respectively.

In other words, the context control unit 34 communicates with the media gateway controller 21 and the media gateway controller 22 with reference to the setting information of the newly generated context and the setting information on each original context, which are being stored in the memory unit 31.

That is to say, the context control unit 34 uses the setting information of the original context A 130 and the original context B 140 during communication with each media gateway controller, while the context control unit 34 actually uses the virtual context C 150 for controlling bearer transfers.

Thus, the media gateway is controlled so as to work as the virtual media gateway through performing the resource optimization processing for resources judged to be redundant, and using of the virtual context newly generated in the resource optimization processing. Meanwhile, the media gateway of the present invention communicates with the media gateway controllers, which control the media gateway, through using the information of the context before the resource optimization processing is performed.

Next, operation of the media gateway with the aforementioned configuration will be described below according to the exemplary embodiment of the present invention.

First, the setting information of the context which is newly generated in the resource optimization processing and the setting information of each original context, which are stored in the memory unit 31, will be described below with reference to FIG. 5. FIG. 5 shows an example of the setting information of the context in the media gateway according to the exemplary embodiment of the present invention.

In FIG. 5, information on the original context which is generated based on the control information transmitted from the media gateway controller is arranged in a left column of FIG. 5. For example, as shown in FIG. 3, since the context A 130 and the context B 140 are generated based on the control information transmitted from the media gateway controllers, the information on the contexts is arranged in the left column thereof.

Moreover, information on the new virtual context generated in the resource optimization processing is arranged in a right column of FIG. 5. For example, as shown in FIG. 4, the virtual context C 150 is generated in the resource optimization processing, and therefore, the information on the virtual context is arranged in the right column of FIG. 5.

And correspondence between the context newly generated in the resource optimization processing and the original context is shown by an arrow in a correspondence column in FIG. 5.

Further, the setting information exemplified in FIG. 5 includes the context, the resources associated with the context and an address of each resource. As mentioned above, the function information and the performance information of the resources associated by the context, such as the termination and the transcoder, are also set up. But, such information is not shown in FIG. 5.

That is, it is necessary for the setting information to include following information:

information required to judge necessity of the resource optimization processing;

information for controlling the media gateway after the resource optimization processing has been performed; and information before the resource optimization processing is performed, which enables communication with the media gateway controllers even after completion of the resource optimization processing.

Indication rule of the resource address column is as follows.

An inside of "[ ]" is separated by ":". The left side of the separation indicates an address of the own resource, and the right side indicates respective addresses of the neighbor resource to left and the neighbor resource to right in inside "( )".

For example, in an example of the termination T1, "[t1:(o1, x1)]" indicates that "t1" is an address of termination T1, "o1" is an address of the node in the first network facing the termination T1, and "x1" is an address of the transcoder X1 which is the resource facing the termination T1 within the media gateway. Each of other resources, such as terminations T2 to T4 and transcoders X1 to X3, are also indicated in a similar manner.

Further, as described above, the termination T1 terminates an ATM based circuit in the first network, and the termination T4 terminates a circuit which carries an IP packet using RTP/UDP in the second network. The termination T2 and the termination T3 are endpoints of the internal connection inside the media gateway.

As the audio data compression technology, a codec type AMR is used in the first network and a codec type G729 is used in the second network. The internal connection inside the media gateway uses an audio data compression scheme G.711, and includes a circuit transmitting an IP packet based on RTP/UDP.

Accordingly, the transcoders X1 to X3 includes a codec type conversion function of AMR/G.711, a codec type conversion function of G.711/G.729, and a codec type conversion function AMR/G.729 respectively.

Operation of the media gateway 1 will be described below with reference to FIG. 6 to FIG. 9 according to the exemplary embodiment of the present invention.

Figure 6:
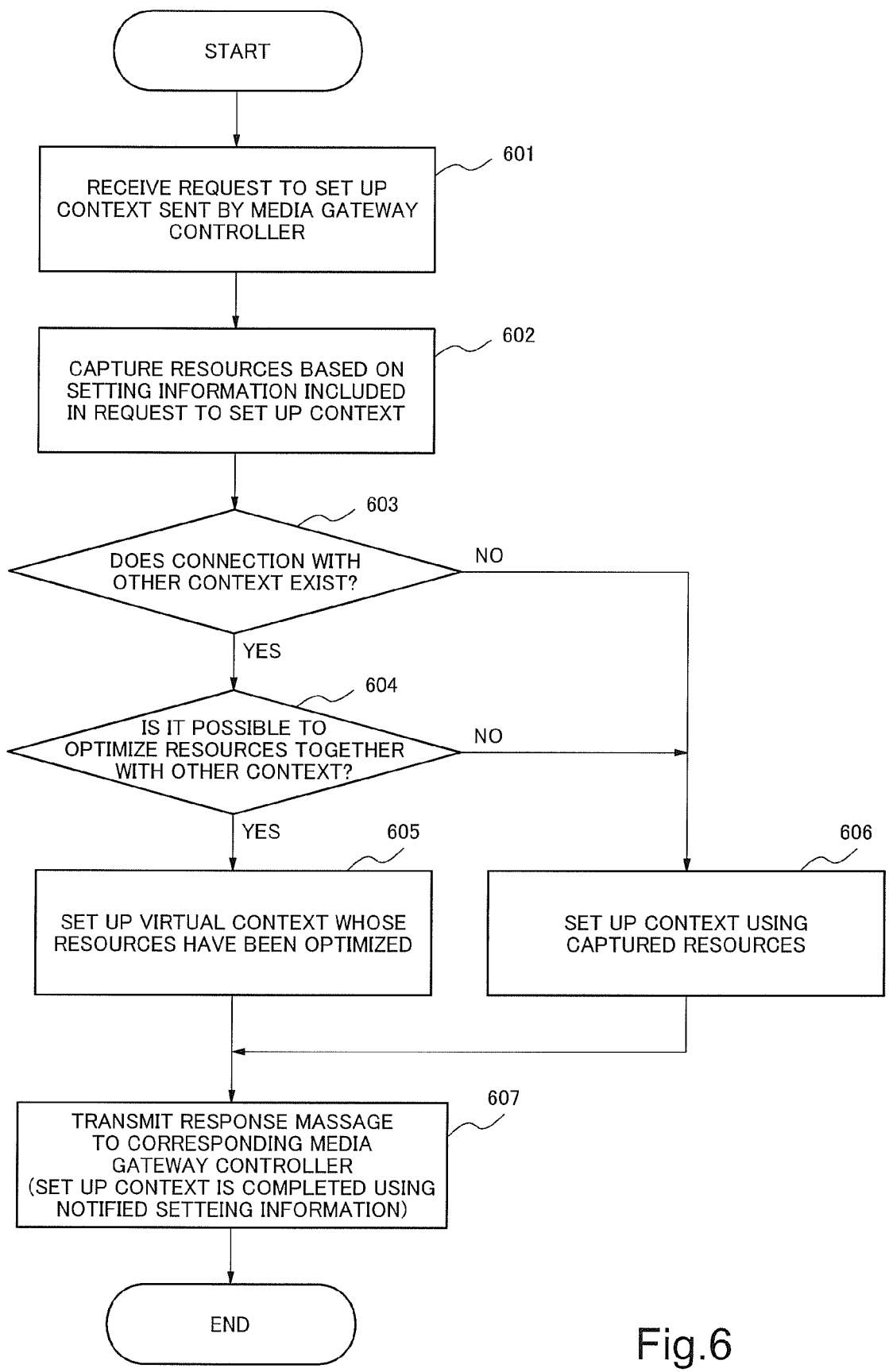
FIG. 6 is a flowchart showing an operation of the media gateway according to the exemplary embodiment of the present invention.
Figure 7:
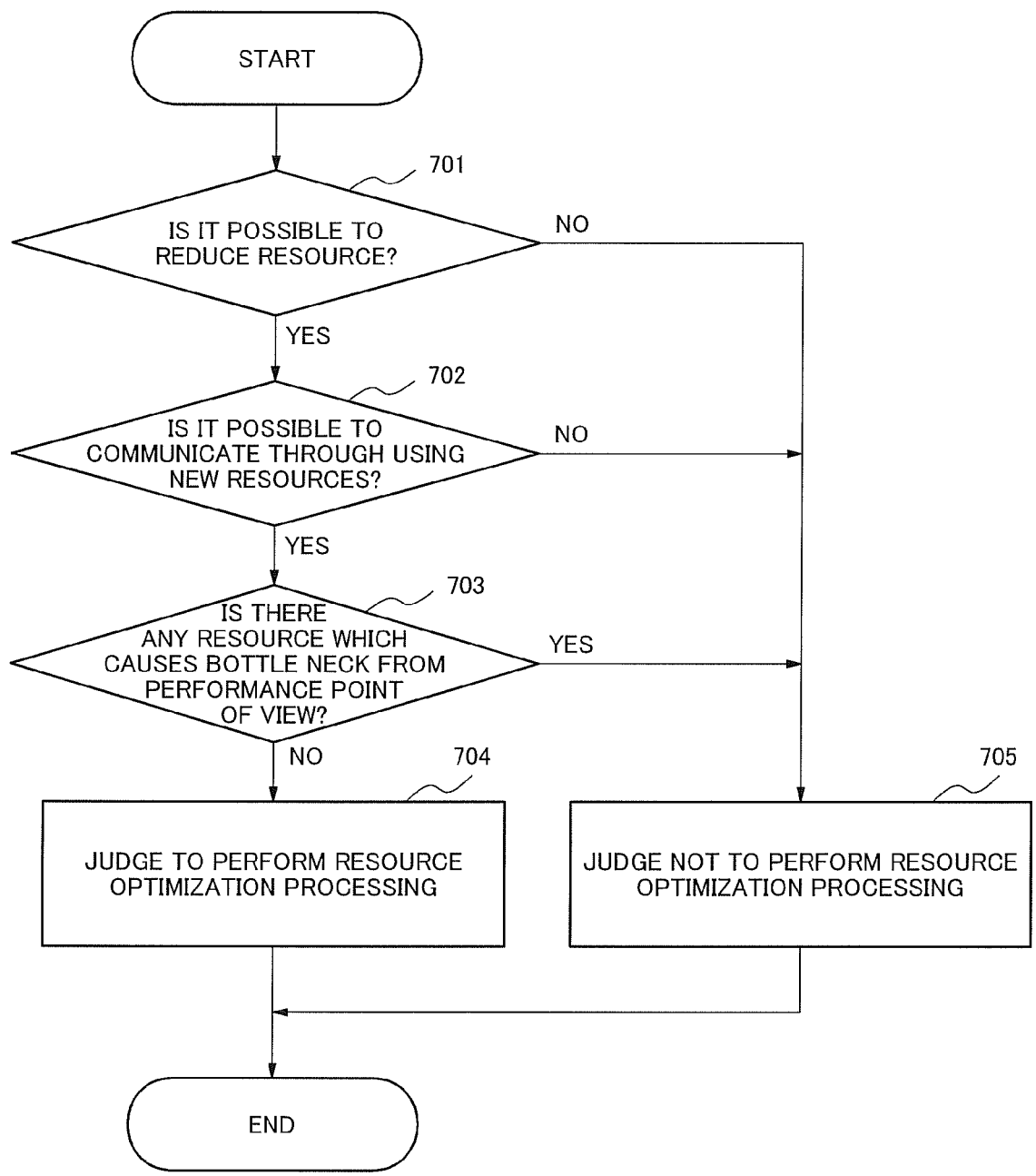
FIG. 7 is a flowchart showing an example of a judgment operation in the resource optimization processing of the media gateway according to the exemplary embodiment of the present invention.
Figure 8A:
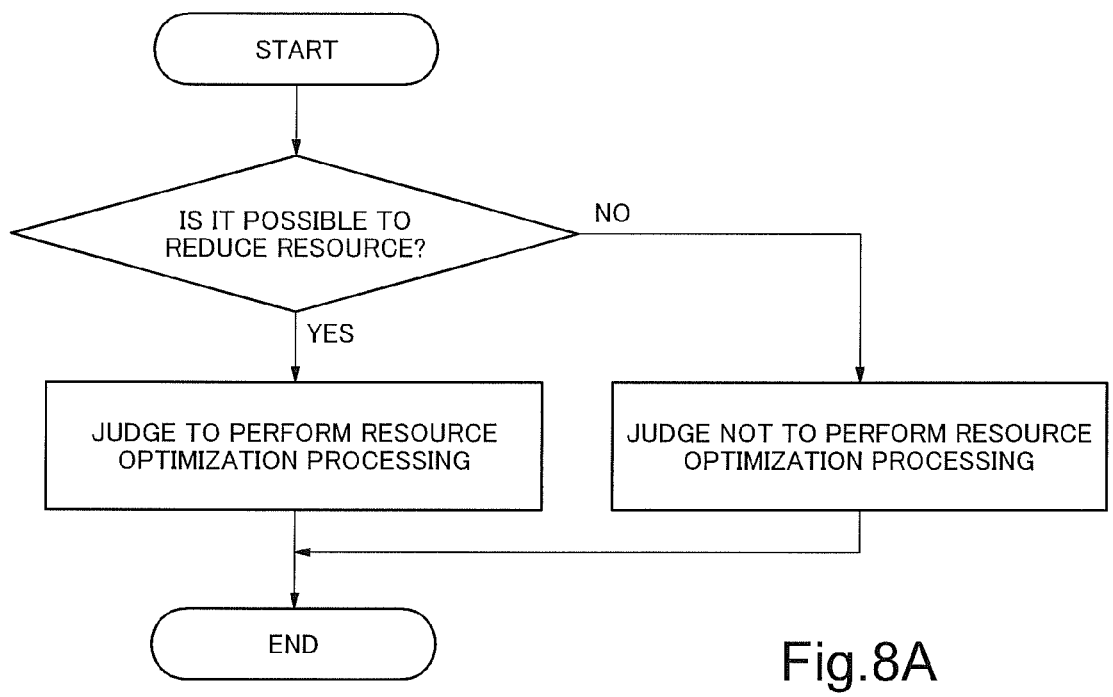
FIG. 8A to FIG. 8D are flowcharts showing other examples of judgment operation in the resource optimization processing of the media gateway according to the exemplary embodiment of the present invention.
Figure 8B:
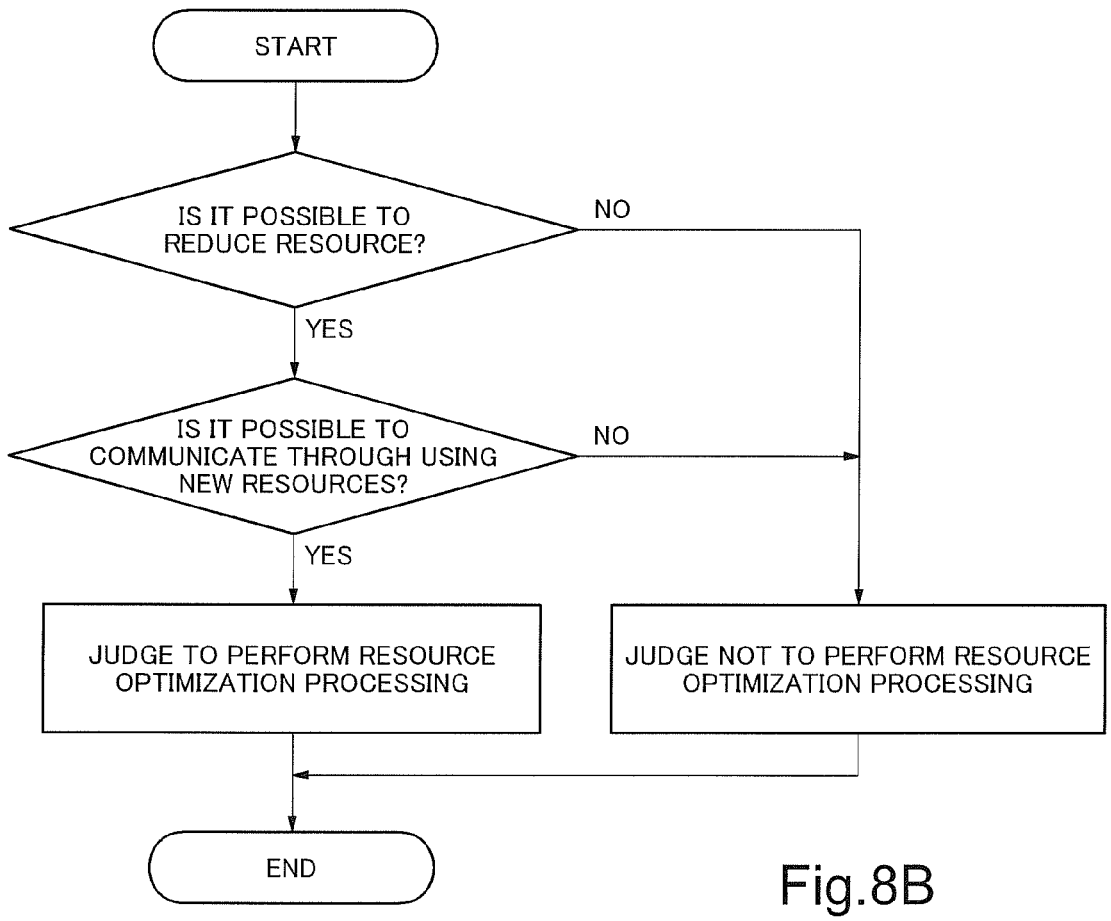
Figure 8C:
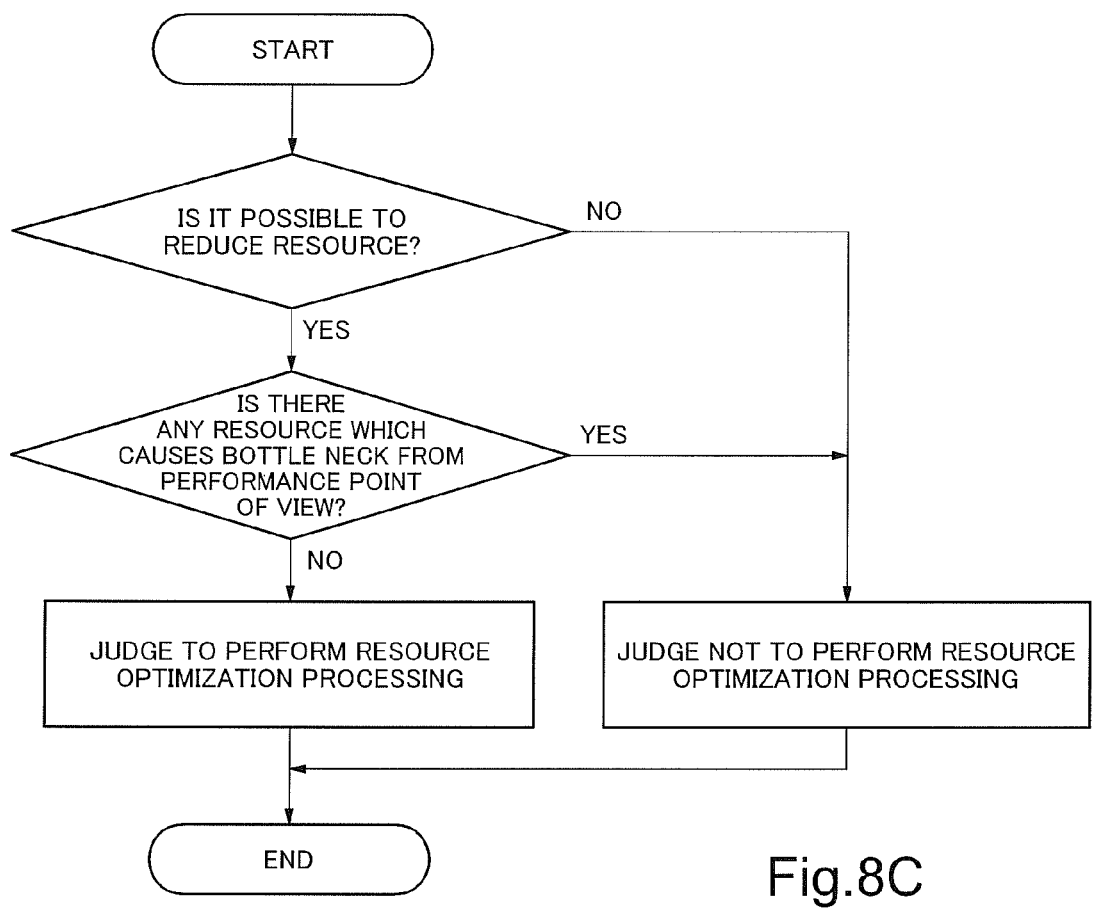
Figure 8D:
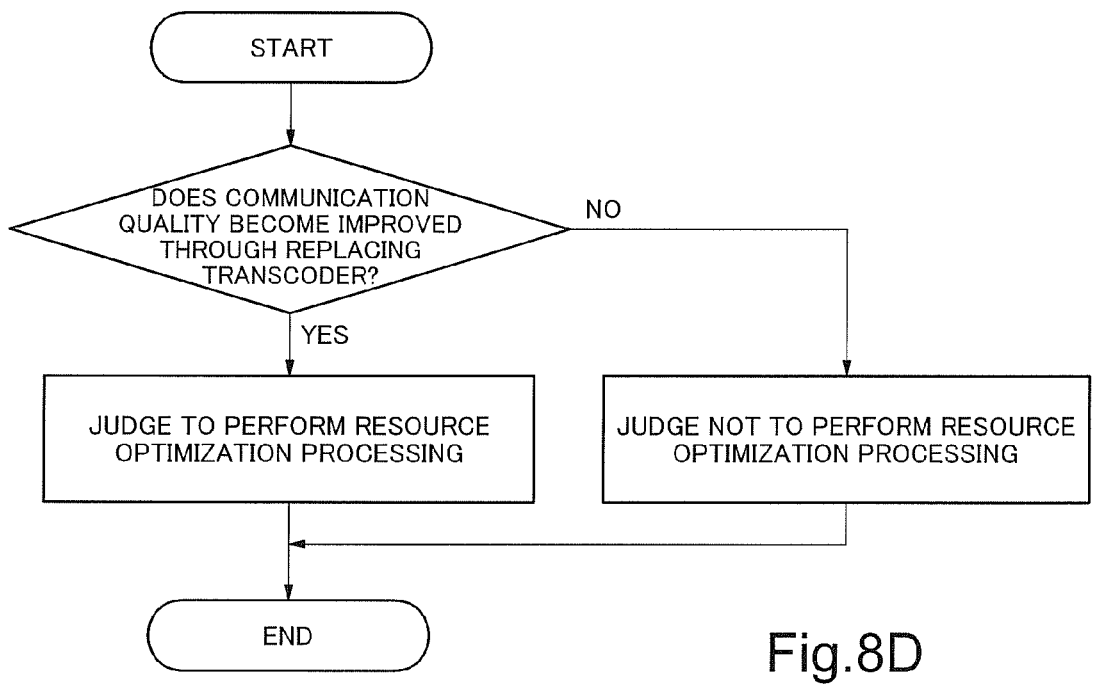
Figure 9:
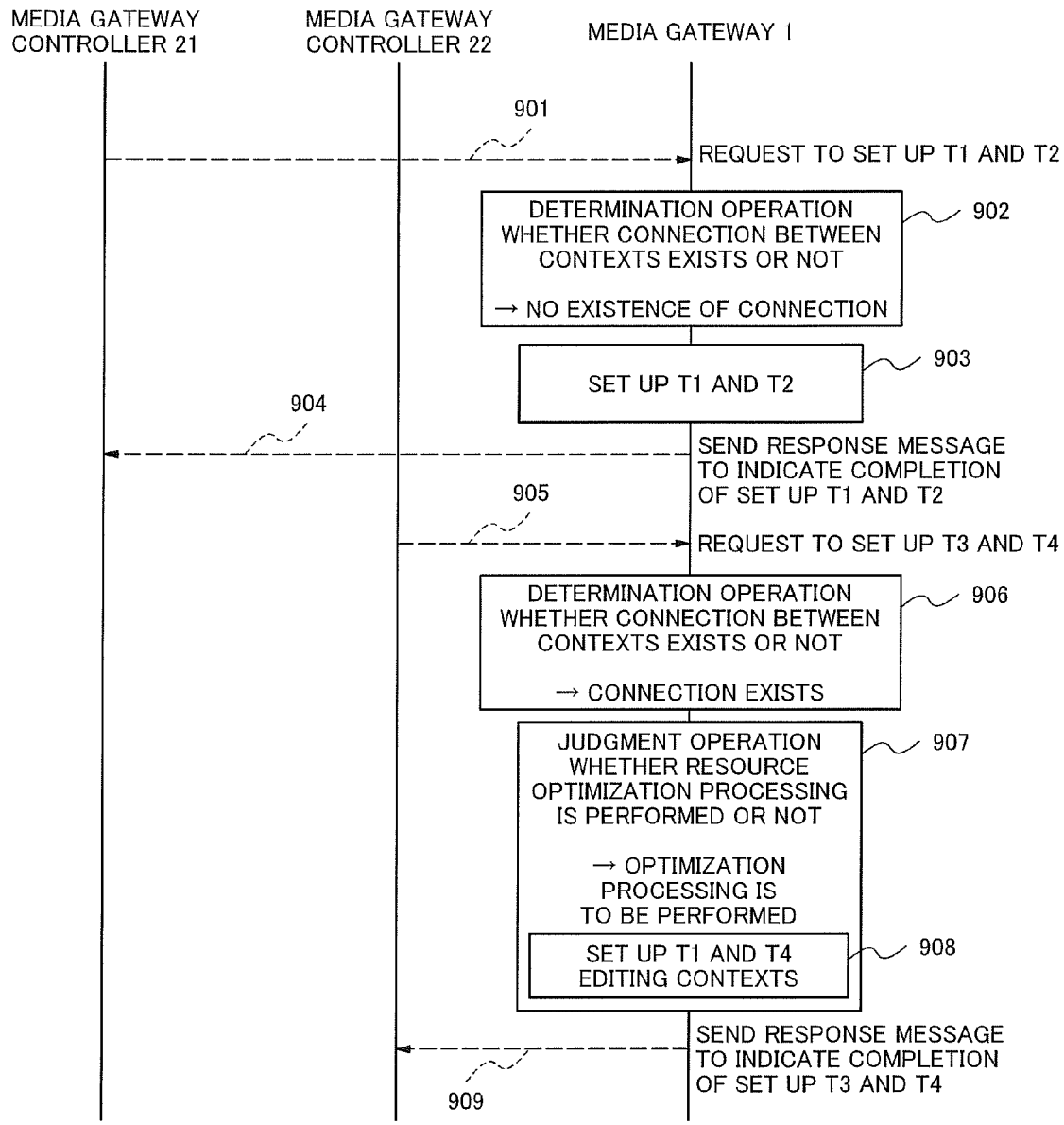
FIG. 9 is a sequence diagram showing a relation between the resource optimization processing of the media gateway and control signals sent to or received from each of media gateway controllers 21 and 22 according to the exemplary embodiment of the present invention.

FIG. 6 is a flowchart showing an operation of the media gateway 1 according to the exemplary embodiment of the present invention. FIG. 7 is a flowchart showing an example of judgment operation of the resource optimization performed by the optimization judgment unit 33 of the media gateway 1. FIGS. 8A to 8D are flowcharts showing other examples of judgment operation of the resource optimization performed by the optimization judgment unit 33 of the media gateway 1. FIG. 9 is a sequence diagram showing relation between the resource optimization processing of the media gateway 1 and control signals sent to or received from each of media gateway controllers 21 and 22.

As mentioned above, the media gateway controller is an apparatus which terminates control signals used in respective networks for a call set up between different types of networks. For example, the SS7 as the control signal in the first network is terminated by the media gateway controller 21, and the control protocol of H.323 in the second network is terminated by the media gateway controller 22. Moreover, the control protocol of MEGACO/H.248 is used between the media gateway 1 and the respective media gateway controllers 21 and 22.

When the media gateway controller 21 receives a control signal such as IAM, ACM, ANM in ISUP (ISDN User Part) of the SS7 for the call request from the first network, the media gateway controller 21 transmits a request message to setup a context (that is, request to set up the termination T1 and the termination T2) to the virtual media gateway 13 of the media gateway 1 (Step 901 of FIG. 9).

A request to set up a context includes setting information of the context based on information which is included in a control signal received from the first network. Specifically, the request to set up the context includes the information that the termination T1 and the termination T2 are associated with each other by the context A via the transcoder X1. The setting information of the context includes an IP address and a port number which each termination uses. Furthermore, the setting information of the context includes function information and performance information of the resources associated with the context.

An operation of the media gateway 1 which has received the request to set up the context from the media gateway controller 21 will be described in the following with reference to FIG. 6.

When the media gateway 1 receives the request message to set up the context from the media gateway controller 21 (Step 601), the media gateway 1 captures related resources based on the setting information included in the request message to set up the context (Step 602). Then, the media gateway 1 generates the context A using the captured resources and stores the setting information of the context A in the memory unit 31 (refer to FIG. 5). Further, these operations are performed by a common functional unit (not illustrated) of the media gateway 1.

Next, the connection determination unit 32 searches for setting information of the related context for the same stream which has been already set up, and the connection determination unit 32 determines whether or not the newly generated context A has a connection with the other context (Step 603). In other words, the connection determination unit 32 confirms existence of the internal connection which is terminated inside the media gateway with respect to the same stream.

Since no connection with the other context exists at this point (No in step 603), the context which uses the captured resource in step 602 is fixed as the context A (Step 606).

The context control unit 34 of the media gateway 1 transmits a response message, which indicates that the setting up of the context requested by the media gateway controller 21 is completed, to the media gateway controller 21 (Step 607). The response message also includes information that the context is set up based on the setting information which is included in the request message to set up the context sent by the media gateway controller 21. That is, the context control unit 34 informs the media gateway controller 21 that the setting up of the context A, which associates the terminations T1 and T2 with each other via the transcoder X1, is completed.

Steps 902 to 904 in FIG. 9 indicate above mentioned operations.

Next, when the media gateway controller 22 receives a control signal related to call setup in the second network, the media gateway controller 22 transmits a message of the request to set up a context (that is, request to set up the termination T3 and the termination T4) to the virtual media gateway 14 of the media gateway 1 (Step 905 in FIG. 9). For example, the media gateway controller 22 may begin control operations when the media gateway controller 21, which performs the processing with regard to the call setup of the first network, transmits the control signal to the media gateway controller 22 which is dedicated to the processing of the second network.

In this case, the request message to set up the context includes the setting information of the context based on the information which is included in the transmitted control signal. Specifically, the request message to set up the context includes information that the context B associates the terminations T3 and T4 with each other via the transcoder X2. As mentioned above, it is clear that the setting information of the context includes information such as IP address and port number which are used by each termination, and the function information and the performance information of the resources.

Operations of the media gateway 1 which has received the request message to set up the context from the media gateway controller 22 will be described below with reference to FIG. 6 once again.

When the media gateway 1 receives the request message to set up the context from the media gateway controller 22 (Step 601), the media gateway 1 captures related resources based on setting information included in the request message (Step 602). The media gateway 1 generates a context B using the captured resource, and store the content B associated with information of the termination T3, T4 and the transcoder X2 as the setting information of the content B, in the memory unit 31 (refer to FIG. 5). Further, these operations are performed by the common functional unit (not illustrated) of the media gateway 1.

Next, the connection determination unit 32 searches for the setting information of the context of the same stream which has been already set up, and the connection determination unit 32 determines whether or not the newly generated context B has a connection with other contexts (Step 603). In other words, the connection determination unit 32 confirms existence of the internal connection which is terminated inside the media gateway with respect to the same stream.

In this case, the setting information of the context A which has been set up in relation to the first network is picked out through searching (Yes in step 603). Specifically, the existence of the internal connection is recognized through finding out association between the information on IP address and port number on the termination T3 and the information on the termination T2, and consequently, the context A is picked out as the same stream relating to the context B.

Next, the optimization judgment unit 33 judges whether or not resource optimization on the context A and the context B is possible (Step 604).

FIG. 7 is a flowchart showing a detailed operation of step 604 in FIG. 6. An example of a judgment operation of the resource optimization performed by the optimization judgment unit 33 of the media gateway 1 will be described below with reference to FIG. 7 according to the exemplary embodiment of the present invention.

The optimization judgment unit 33 judges whether or not the resource optimization processing is possible, through comparing the setting information (such as codec types and circuit classes) of the context A with that of the context B. Specifically, the optimization judgment unit 33 judges whether or not it is possible to set up the virtual connection C in which the number of the resources are reduced, based on the setting information stored in the memory unit 31.

First, the optimization judgment unit 33 confirms existence of a termination which can be omitted, and judges that it is possible to omit the termination T2 and the termination T3 (Yes in step 701). Then, the optimization judgment unit 33 judges availability of a tanscoder, which directly enables the audio data compression and conversion of AMR/G.729, as a substite for the transcoder X1 and the transcoder X2 (Step 702). Moreover, the optimization judgment unit 33 judges whether or not a bottleneck in performance exists in consideration of processing power of the substituting transcoder and the termination (Step 703).

When each judgment is affirmative (or no difficulty is found by each judgment), the optimization judgment unit 33 outputs the final judgment that it is possible to generate the context C which associate the termination T1 and the termination T4 with each other via the transcoder X3 (Step 704).

On the other hand, when the optimization judgment unit 33 judges that any one of above-mentioned judgments is not affirmative (or any difficulty is found), the optimization judgment unit 33 outputs the final judgment that it is impossible to perform the resource optimization (Step 705).

Further, the above-mentioned judgment is based on all the criteria for judgment, that is, the first criterion to the third criterion mentioned above. Meanwhile, as shown in FIGS. 8A to 8C, the above-mentioned judgment may be based on the criterion with regard to the number of the resource to be reduced associated to the context (the first criterion). Moreover, the above-mentioned judgment may include at least one of the criterion with regard to the possibility of communication through use of resources associated to the context (the second criterion) and the criterion with regard to the existence of the bottleneck in performance (the third criterion), in addition to the first criterion. As shown in FIG. 8D, when it is judged that the substitution of the transcoder efficiently enables the codec conversion for the audio data compression, and as a result, quality of communication becomes improved, the optimization judgment unit 33 may judge that it is possible to perform the resource optimization processing, even if the number of resources is not reduced.

An operation of the media gateway 1 based on the judgment of the optimization judgment unit 33 will be described below with reference to FIG. 6 once again.

First, when the optimization judgment unit 33 outputs a judgment that the resource optimization processing is not performed (No in step 604), the media gateway 1 fixes setup of the context B which uses the captured resources in step 602 (Step 606). As a result, the media gateway 1 processes the bearer transfer of the call based on the context A and the context B which are connected with each other by the internal connection.

On the other hand, when the optimization judgment unit 33 outputs the judgment that the resource optimization processing is performed (Yes in step 604), the optimization processing unit 35 generates the virtual context C which associates the termination T1 and the termination T4 with the new transcoder X3 and stores the context A and the context B corresponded to the virtual context C in the memory unit 31 (Step 605).

Specifically, as shown in FIG. 5, with respect to the context A, which has been generated based on the setting up request by the media gateway controller 21, the resource information on the virtual context C is made a connection with the original resource information (association information including T1, T2 and X1), and is stored in the memory unit 31. Similarly, with respect to the context B, which has been generated based on the setting up request by the media gateway controller 22, the resource information on the virtual context C is made a connection with the original resource information (association information including T3, T4 and X2), and is stored in the memory unit 31. As a result, each of the context A and the context B has a connection with the setting information of the virtual context C, which is associated with the resources (T1, T4, and X3) obtained after completion of the resource optimization processing. Then, the media gateway 1 processes the bearer transfer for the call by the virtual context C.

And, the context control unit 34 of the media gateway 1 transmits a response message, which indicates that setup of the context requested by the media gateway controller 22 is completed, to the media gateway controller 22 in step 607 of FIG. 6. At this time, the context control unit 34 transmits the response message including the information that the context is set up based on the setting information notified by the media gateway controller 22, even where either step 605 or step 606 is completed. That is, the context control unit 34 informs the media gateway controller 22 that the setup of the context B, which associates the termination T3 and T4 with each other via the transcoder X2, is completed.

With regard to the media gateway according to the exemplary embodiment of the present invention, the number of physical resources which are actually used is optimized to two terminations and one transcoder through processing the above mentioned steps, and then the bearer transfer for the call is processed through using the optimized resources. While the resource optimization processing is performed, the control message is transmitted between the media gateway and the media gateway controller based on the original resource information which is obtained before the resource optimization processing.

That is, the present invention provides the media gateway which can perform the resource optimization without any influence on an existing protocol between the media gateway and the media gateway controller. Therefore, even if the media gateway performs the resource optimization processing, the media gateway controller can communicate with the media gateway through the same protocol as before without respect to the resource optimization processing.

Next, operation for releasing the contexts will be described below with reference to FIG. 10 and FIG. 11.

Figure 10:
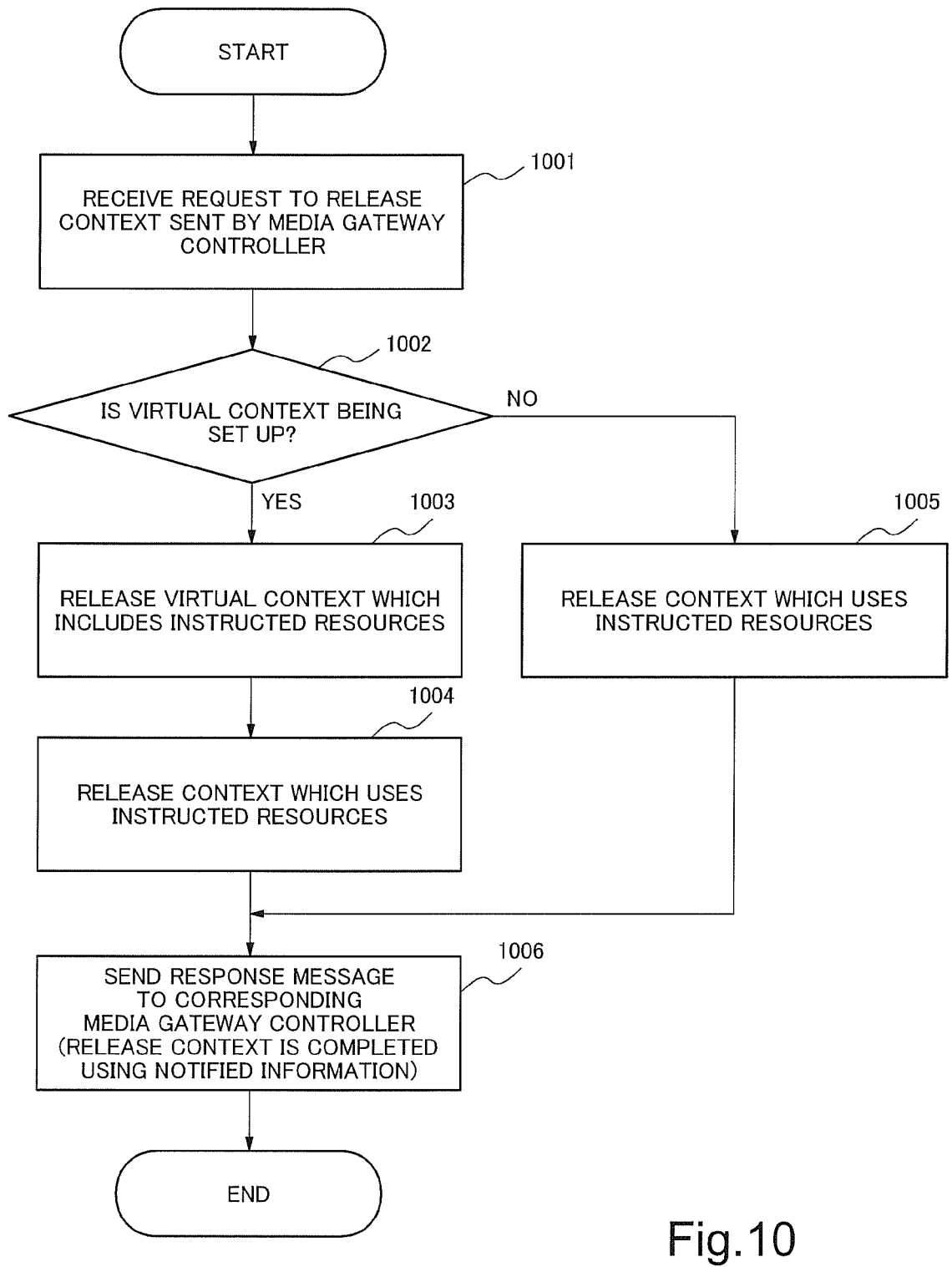
FIG. 10 is a flowchart showing an operation in which setting of the context is released in the media gateway according to the exemplary embodiment of the present invention.
Figure 11:
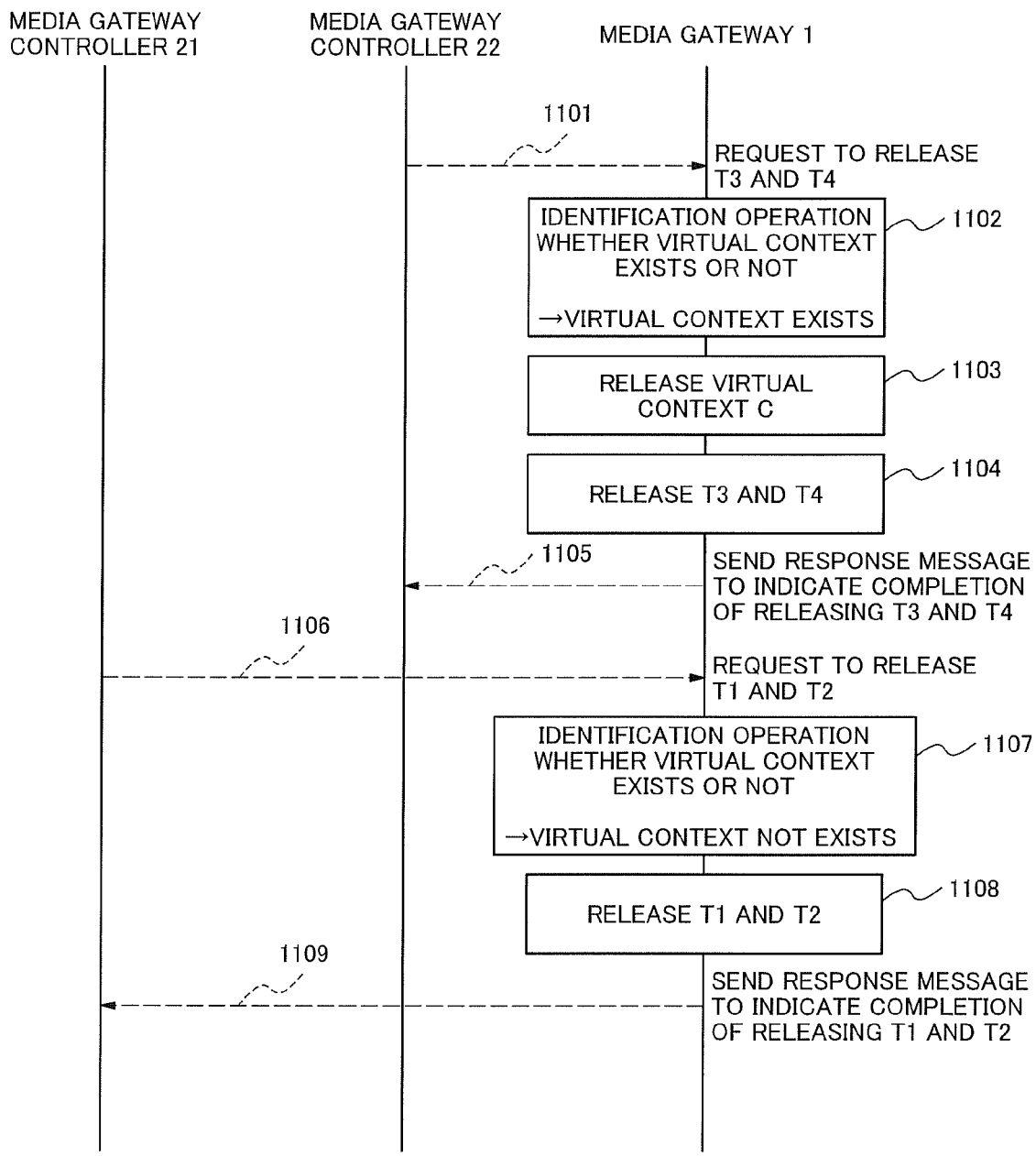
FIG. 11 is a sequence diagram showing the relation between the resource optimization processing and the control signals sent to or received from each of media gateway controllers 21 and 22 in case that the setting of the context is released in the media gateway according to the exemplary embodiment of the present invention.

FIG. 10 is a flowchart showing operation in which the contexts are released in the media gateway according to the exemplary embodiment of the present invention. FIG. 11 is a sequence diagram showing control signals sent to or received from each of media gateway controllers 21 and 22, when the contexts are released in the media gateway according to the embodiment of the present invention. Step 1001 of FIG. 10 corresponds to step 1101 and step 1106 of FIG. 11. Steps 1002 to 1006 of FIG. 10 correspond to steps 1102 to 1105 and steps 1107 to 1109 of FIG. 11.

First, when the media gateway receives a request to release the termination T3 and the termination T4, which are resources associated with the context B, from the media gateway controller 22 (Step 1001 and step 1101), the context control unit 34 of the media gateway 1 confirms existence of the virtual context (Step 1002 and step 1102). When the media gateway has optimized the resources and is performing control operation through using the virtual context C, correspondence between the virtual context C and the context B is identified with reference to information stored in the memory unit 31 because the context B has information on the termination T3 and the termination T4 which are ordered to be released (Step 1002, Yes).

The context control unit 34 releases the virtual context C (Step 1003 and step 1103) and then, releases the context B (Step 1004 and step 1104). The context control unit 34 transmits a response message, which indicates that the release operation of the context requested by the media gateway controller 22 is completed, to the media gateway controller 22 (Step 1006 and step 1105). At this time, the context control unit 34 informs the media gateway controller 22 that the context B which associates the termination T 3 with the termination T 4 via the transcoder X 2 is released.

Next, when the media gateway receives a request to release the termination T1 and the termination T2, which are resources associated to the context A (Step 1001 and step 1106), the context control unit 34 of the media gateway 1 confirms existence of the virtual context (Step 1002 and Step 1107). Meanwhile, correspondence to the virtual context is not identified, because the virtual context C has been released in steps 1003 and 1004 mentioned above and only the context A is left in the memory unit 31 (No in step 1002 and step 1107).

Accordingly, the context control unit 34 releases the context A and transmits a response message, which indicates that the release operation of the context requested by the media gateway controller 21 is completed, to the media gateway controller 21 (Step 1006 and step 1109). At this time, the context control unit 34 informs the media gateway controller 21 that the context A which associates the termination T 1 with the termination T 2 via the transcoder X1 is released.

As mentioned above, the release operation of the contexts in the media gateway is performed according to the exemplary embodiment of the present invention. Further, the media gateway receives the request to release context A after receiving the request to release the context B in the above exemplary embodiment. Meanwhile, the media gateway may receive the request to release context B after receiving the request to release the context A. In this case, when the media gateway receives the request to release the context A from the media gateway controller 21, existence of the virtual context C is identified, and the virtual context C is released by the context control unit 34.

According to the preferred embodiment of the present invention mentioned above, the media gateway has a means to confirm existence of the connection between the contexts terminated inside the media gateway. The media gateway also has a means to generate the new context through combining the contexts when the media gateway identifies that such the connection exists. As a result, the media gateway can save the resources and use them efficiently. For example, the optimization of the resource utilization can reduce an unnecessary codec operation for the audio data compression, and consequently, contribute to improve the communication quality.

Figure 12A:
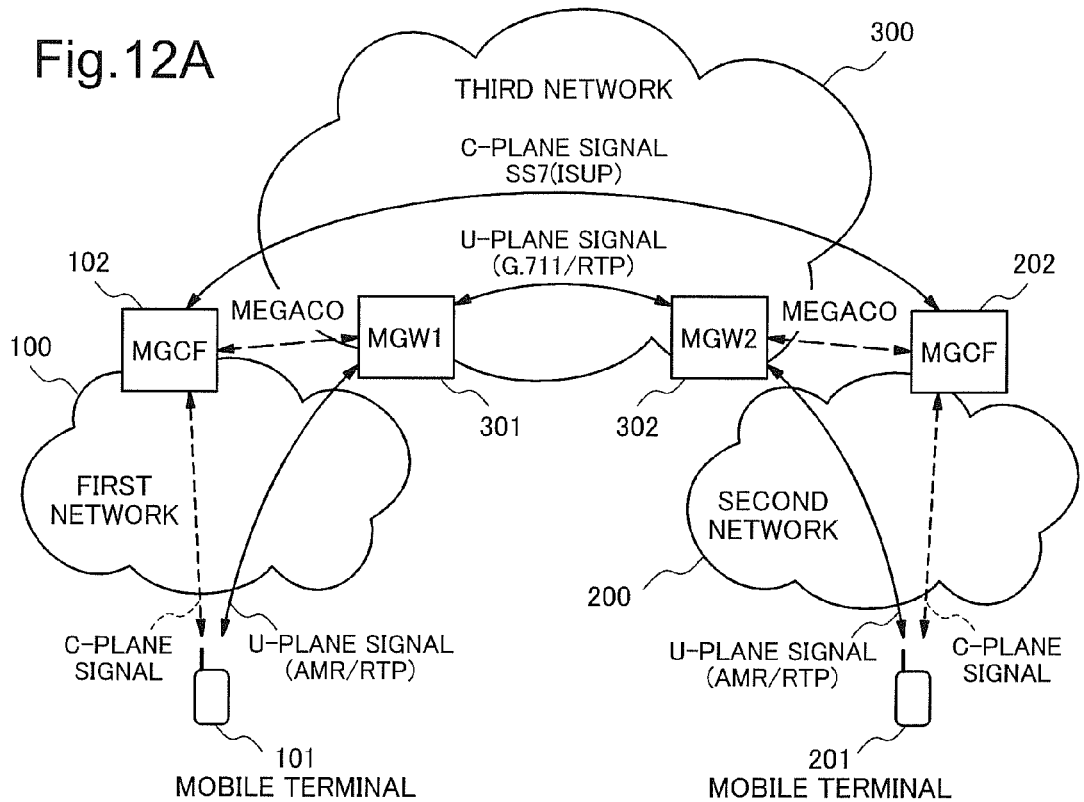
FIGS. 12A and 12B show another example of network environment to which the preferred embodiment of the present invention can be applied.
Figure 12B:
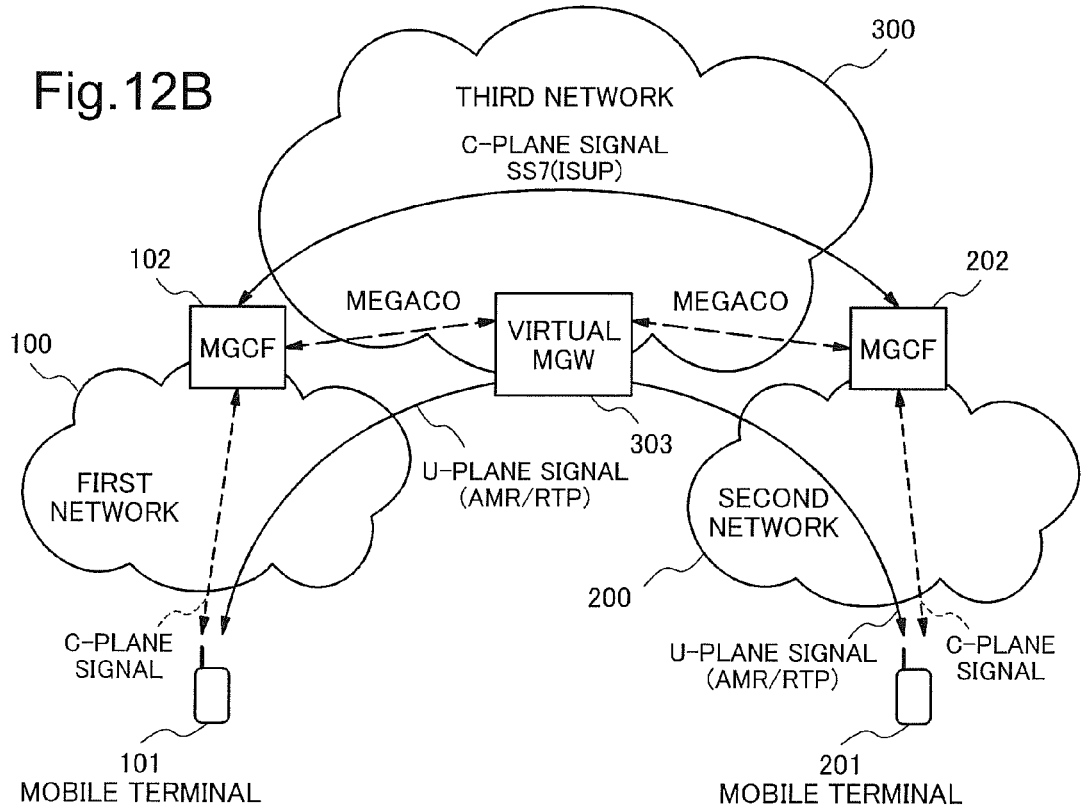

Moreover, although the preferred embodiment of the present invention has been explained with referring to the network configuration shown in FIG. 1, the preferred embodiment of the present invention can also be applied in other network environments. FIGS. 12A and 12B show another example of network environment to which the preferred embodiment of the present invention can be applied. FIG.

12A shows a network arrangement prior to performing the optimization according to the preferred embodiment of the present invention, and FIG. 12B shows an optimized network arrangement performed by the preferred embodiment of the present invention.

In this network environment, each of the first network 100 and the second network 200 is a mobile network using an IMS (IP Multimedia System) and voice communications are performed by the VoIP, and the network is managed by different network operator each other. The third network 300 is the PSTN managed by another network operator for providing inter network communications between the first network 100 and the second network 200. Under such a network environment, signal conversions for the respective C(control)-Plane signals and the U(user)-Plane signals are required between the first network 100 and the third network 300, also between the third network 300 and the second network 200, for establishing a communication path between a mobile terminal 101 in the first network and a mobile terminal 201 in the second network 200.

An MGCF (Media Gateway Controller Function) 102 and an MGCF 202 perform the C-Plane signal conversion, and an MGW1 (Media Gateway 1) 301 and an MGW2 (Media Gateway 2) 302 perform the U-Plane signal conversion. In the U-Plane signal conversion, a virtual MGW (Media Gateway) 303 is applicable as an optimized configuration if resources to be optimized are available in the MGW1 and the MGW2 as explained in the preferred embodiment of the present invention.

Each of the patent documents 1 to 3 described in the background art has difficulties for reducing the resource of the apparatus autonomously and efficiently.

For example, according to a technology described in the patent document 1, reconfiguration or rebuilt for an apparatus of an entire system is required when a signaling system or protocol or the like in a destination communication system is changed. That is, it is necessary to reconfigure an access node of the second mobile radio network to make a new functional configuration, when an access node of the first mobile radio network is reconfigured. In particular, along with scaling up of the communication system, hardware such as a communication apparatus should be increased in volume and consequently, it is a heavy load for the network operator. Therefore, the technology described in the patent document 1 is not efficient from resource saving point of view.

Although the patent document 2 discloses a technology that the media gateway changes coding most suitably by a command transmitted from the media gateway controller, the patent document 2 does not refer to the autonomous control method for resource optimization by the media gateway.

The patent document 3 discloses a media gateway which adds a semi-permanent termination to a context. However, the technology disclosed by the patent document 3 is limited to the technology for adding the context, and consequently, the technology has a problem of waste of the hardware resource.

According to the preferred embodiment of the present invention mentioned above, a newly generated virtual context and each of a plurality of original contexts having been used for generating the virtual context are corresponded and the association with each other is stored. Accordingly, bearer transmission is controlled based on the newly generated virtual context, and furthermore, a control signal can be transmitted between a media gateway and a media gateway controller based on each of information of the original contexts. Therefore, it is possible to realize optimization of resources to be used, without changing a current interface condition with the media gateway controller, without installing specific software in the media gateway controller, and without changing the control apparatus configuration.

According to the preferred exemplary embodiment of the present invention mentioned above, the resource optimization processing is performed autonomously by the media gateway. Therefore, the media gateway controller has no necessity to control the resource optimization of the media gateway. Accordingly, the load of the media gateway controller does not increase.

Further, according to the preferred exemplary embodiment of the present invention mentioned above, each unit of the media gateway consists of hardware as mentioned above. A part or a whole of each unit may be realized by a program and an information processing unit for executing the program.

While the invention has been particularly shown and described with reference to exemplary embodiment thereof, the invention is not limited to this embodiment. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. A media gateway which
   (a) generates a plurality of contexts independently from each other based on respective control messages transmitted from respective media gateway controllers corresponding to a first network and a second network, and
   (b) performs media conversion for bearer transfers using the plurality of contexts between the first network and the second network, comprising:
      a memory unit which stores setting information, function information and performance information for resources associated with each of the plurality of contexts, wherein the function information indicates a function of the resources and an available function, and the performance information includes information on processing power of a device;
      a context determination unit which determines whether or not an internal connection which connects a plurality of contexts for a same stream within the media gateway exists between the contexts corresponding to each of the first network and the second network based on the setting information stored in the memory unit;
      an optimization judgment unit which judges whether a new context, generated by combining the contexts originally corresponding to each of the first network and the second network and omitting functionally redundant resources, may maintain communication including media conversion between the first network and the second network, based on the function information or the performance information stored in the memory unit, when the context determination unit determines that the internal connection exists;
      an optimization processing unit which generates the new context when the optimization judgment unit judges that the new context can be generated, and associates the setting information of the new context with each of the setting information on the contexts originally corresponding to each of the first network and the second network; and
      a context control unit which controls the bearer transfer between the first network and the second network by using the new context, and transmits a response message including information that the context is set up to each of the media gateway controllers by using the setting information on the contexts originally corresponding to each of the first network and the second network, respectively.

2. The media gateway according to claim 1, wherein the optimization judgment unit judges whether the new context may cause resource to become a bottleneck in performance based on the function information or the performance information on resources stored in the memory unit.

3. The media gateway according to claim 1, wherein the optimization judgment unit judges to generate the new context, when a total number of the resources associated to the new context is smaller than a total number of the resources associated to the contexts originally corresponding to each of the first network and the second network.

4. The media gateway according to claim 1, wherein the optimization judgment unit judges to generate the new context, when quality of communication is improved by combining the contexts originally corresponding to each of the first network and the second network even if the number of resources is not reduced.

5. A method for controlling a media gateway which generates a plurality of contexts independently from each other based on respective control messages transmitted from respective media gateway controllers corresponding to a first network and a second network and performs media conversion for bearer transfers using the plurality of contexts between the first network and the second network, comprising:

storing setting information, function information and performance information for resources associated to each of the plurality of contexts in a memory unit, wherein the function information indicates a function of the resources and an available functions, and the performance information includes information on processing power of a device;

determining whether or not there exists an internal connection which connects a plurality of contexts for the same stream within the media gateway between the contexts corresponding to each of the first network and the second network based on the setting information stored in the memory unit judging whether generating a new context by combining the contexts originally corresponding to each of the first network and the second network and omitting functionally redundant resources is possible in a point of view of maintaining communication including media conversion between the first network and the second network based on the function information or the performance information stored in the memory unit, when existence of the internal connection is determined;

generating the new context when it is judged that the new context can be generated, and associating the setting information of the new context with each of the setting information on the contexts originally corresponding to each of the first network and the second network; and controlling the bearer transfer between the first network and the second network by using the new context, and transmits a response message including information that the context is set up to each of the media gateway controller by using the setting information on the contexts originally corresponding to each of the first network and the second network respectively.

6. The control method according to claim 5, further comprising:

judging whether generating the new context is possible in a point of view of existence of a bottlenecked-resource in performance based on the function information or the performance information on resources stored in the memory unit.

7. The control method according to claim 5, further comprising:

judging to generate the new context when a total number of the resources associated to the new context is smaller than a total number of the resources associated to the contexts originally corresponding to each of the first network and the second network.

8. The control method according to claim 5, further comprising:

judging to generate the new context, when quality of communication is improved by combining the contexts originally corresponding to each of the first network and the second network even if the number of resources is not reduced.

* * * * *